United States Patent [19]

Keller et al.

[11] Patent Number: 5,348,917

[45] Date of Patent: Sep. 20, 1994

[54] CERAMICS FORMED BY PYROLYSIS OF EITHER LINEAR OR THERMOSETTING CARBORANE (SILOXANE OR SILANE) ACETYLENE BASED PRECURSOR POLYMERS

[75] Inventors: Teddy M. Keller; Leslie J. Henderson, Jr., both of Alexandria, Va.

[73] Assignee: The United States of America as represented by the Secretary of the Navy, Washington, D.C.

[21] Appl. No.: 14,928

[22] Filed: Feb. 8, 1993

Related U.S. Application Data

[63] Continuation-in-part of Ser. No. 991,940, Dec. 17, 1992, Pat. No. 5,292,779, which is a continuation-in-part of Ser. No. 983,194, Nov. 30, 1992, Pat. No. 5,272,237.

[51] Int. Cl.$^5$ .......................................... C04B 33/56
[52] U.S. Cl. ...................................... 501/92; 501/87; 501/88; 501/93; 501/96
[58] Field of Search .................. 501/87, 88, 92, 93, 501/96

[56] References Cited

U.S. PATENT DOCUMENTS

| | | | |
|---|---|---|---|
| 4,097,294 | 7/1978 | Rice et al. | 501/87 |
| 4,857,490 | 8/1989 | Johnson | 501/87 |
| 5,112,779 | 5/1992 | Burns et al. | 501/90 |
| 5,130,278 | 7/1992 | Riccitiello et al. | 501/92 |

OTHER PUBLICATIONS

Inorganic and Organometallic Polymers M. Zeldin et al. (eds.), Amer. Chem. Soc. Washington, D.C., (1988) at pp. 44, 90.
Efficient "One Pot" Synthesis of Silylene-Acetylene and Disilylene-Acetylene Preceramic Polymers From Trichloroethylene, Ijadi-Maghsoodi et al. J. of Polymer Science : Part A vol. 28, 955 (1990) at p. 958 no month.
Ceramics Via Polymer Pyrolysis, K. J. Wynne et al. 14 Ann. Rev. Mat. Sci 29 (1984) no month.
High Temperature Siloxane Elastomers, F. Dvornic et al., Huthig & Wepf Verlag Basel, N.Y., (1990) at pp. 277, 282 no month.
Poly (Dodecacarborane-Siloxanes), E. Peters, J. Macromol. Sci.-rev. Macromol. Chem., C 17(2), (1979), at pp. 190-199 no month.
Synthesis and Study of Silyene-Diacetylene Polymers, Maghsoodi et al. 23 Macromolecules (1990) at p. 4486 no month.
d-Orbital Effects in Silicon Substituted δ-Electron Systems. Part XII. Some Spectroscopic Properties of Alkyl and Silyl Acetylenes and Polyacetylenes, H. Bock et al., J. Chem. Soc. (B), (1968) at p. 1159 no month.
Silylation As A Protective Method For Terminal Alkynes in Oxidative Couplings-A General Scheme of the Parent Polyynes, U. Eastmond et al., 28 Tetrahedron 4601 (1972) no month.
A New Series of Organoboranes, VI. The Synthesis and Reactions of Some Silyl Neocarboranes, Papehi et al., 3 Inorg Chem 1448 (1964) at 1449 no month.
A New Series of Organoboranes VII The Preparation of Poly-m-Carboranylenesiloxanes, Papetti et al., 4 J. of Polymer Sci.: Part A-1, 1623 (1966) at p. 1630 no month.
Icosahedral Carboranes. XV. Monomeric Carboranylene Siloxanes, Scott et al. J. Inorg. Chem 2597 (1970) at p. 2599 no month.
Poly [ethylene (3-n-butyl-2,5-thiophenediyl)-ethynylene]: A Soluble Polymer Containing Diacetylene Units and Its Conversion to a Highly Cross-Linked Organic Solid, Callstrom et al., 21 Macromolecules 3528-3530 (1988) no month.
Hypercross-Linked Organic Solids: Preparation from Poly (aromatic diacetylenes) and Preliminary Measurements of their Young's Modulus, Hardness, and Thermal Stability, Neenan et al., 21 Macromolecules 3525-3528 (1988) no month.

Primary Examiner—Karl Group
Assistant Examiner—C. Bonner
Attorney, Agent, or Firm—Thomas E. McDonnell

[57] ABSTRACT

Ceramics that are formed from high temperature oxidatively stable thermosetting polymers which, in turn, are formed from linear polymeric materials having repeat units that contain at least one alkynyl group for crosslinking purposes and at least one bis(silyl or siloxanyl)-carboranyl group.

30 Claims, 2 Drawing Sheets

CERAMICS FORMED BY PYROLYSIS OF EITHER LINEAR OR THERMOSETTING CARBORANE (SILOXANE OR SILANE) ACETYLENE BASED PRECURSOR POLYMERS

CROSS REFERENCE TO RELATED APPLICATION

This is a continuation-in-part of prior application with Ser. No. 07/991,940 filed on Dec. 17, 1992 by Keller et al. titled Carborane-(Silane or Siloxane)-Unsaturated Hydrocarbon Based Thermosetting Polymers and designated by Navy Case No. 74,948, now U.S. Pat. No. 5,292,779, which is itself a continuation-in-part of the parent application with Ser. No. 07/983,194 filed on Nov. 30, 1992 by Keller et al. titled Carborane-(Siloxane or Silane)-Unsaturated Hydrocarbon Based Polymers and designated by Navy Case No. 74,945 now U.S. Pat. No. 5,272,237, both of which are incorporated by reference herein.

BACKGROUND OF THE INVENTION

1. Field of the Invention

This invention relates to a new class of novel ceramic materials that are formed from linear inorganic-organic hybrid polymers of varying molecular weight. These new ceramics are formed from oxidatively stable thermosetting polymers which, in turn, are formed from linear polymeric materials having repeating units that contain at least one alkynyl group for cross-linking purposes and at least one bis(silyl or siloxanyl)carboranyl group. The thermosetting polymers are converted into the novel ceramics, the subject of the present invention, at elevated temperatures.

2. Description of the Related Art

The cross linking of acetylenic polymers has been demonstrated by Neenan et al. in *Hypercross-Linked Organic Solids: Preparation from Poly(aromatic diacetylenes) and Preliminary Measurements of Their Young's Modulus, Hardness, and Thermal Stability* published in 21 MACROMOLECULES 3525-28 (1988). The reaction for cross linking acetylenic polymers illustrated by Neenan et al. is as follows:

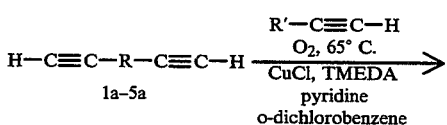

$$H-C\equiv C-R-C\equiv C-H \xrightarrow[\substack{CuCl, TMEDA \\ pyridine \\ o\text{-dichlorobenzene}}]{\substack{R'-C\equiv C-H \\ O_2, 65° C.}} \quad (1)$$

1a-5a

-continued

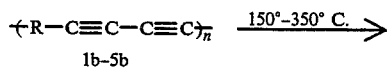

$$\xrightarrow{150°-350° C.}$$

1b-5b

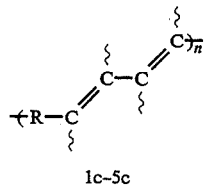

1c-5c

1, R = 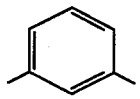   R' = 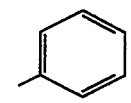

2, R = 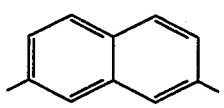   R' = 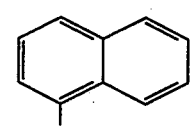

3, R = 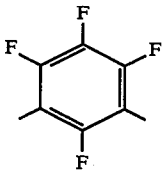   R' = 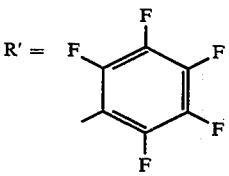

4, R =    R' = 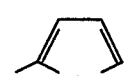

5, R = 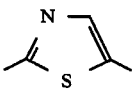   R' = 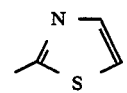

where n is a positive integer. Other similar cross linking reactions are demonstrated by Callstrom et al. in *Poly[ethynlyene(3-n-butyl-2,5-thiophenediyl)-ethynylene]: A Soluble Polymer Containing Diacetylene Units and Its Conversion to a Highly Cross-Linked Organic Solid* published in 21 MACROMOLOCULES 3528-30 (1988). For example, see the reactions shown below taken from Callstrom et al.:

Scheme I

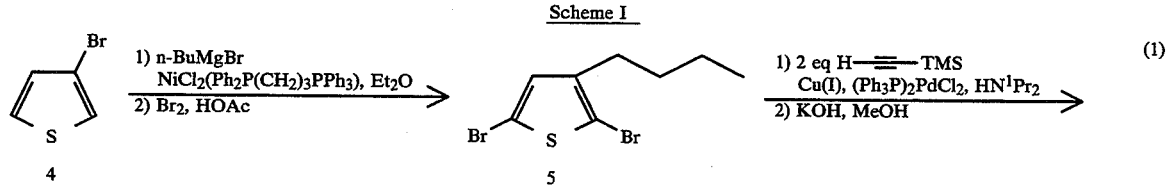

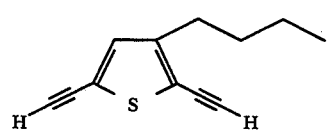

1

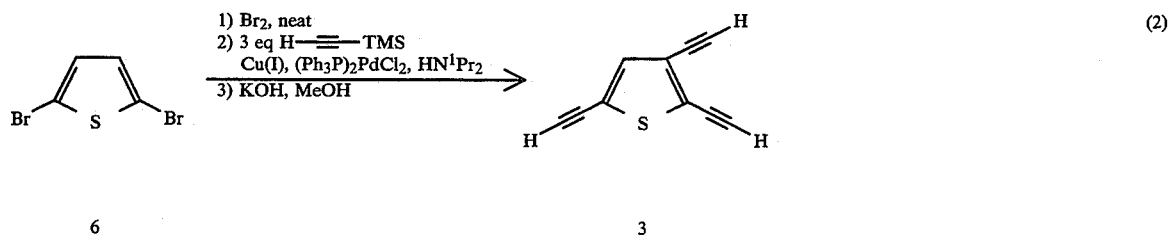
(2)
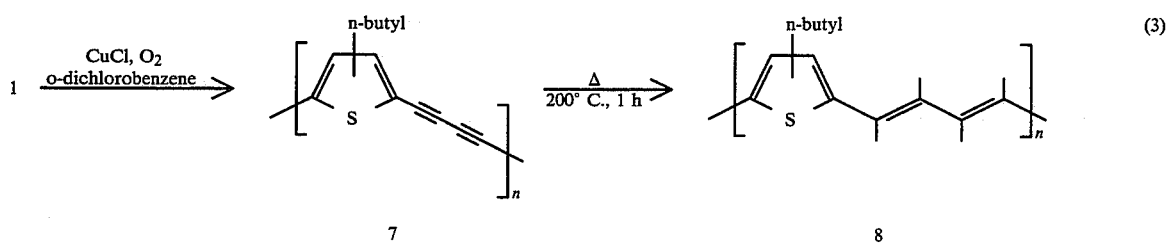
Scheme II
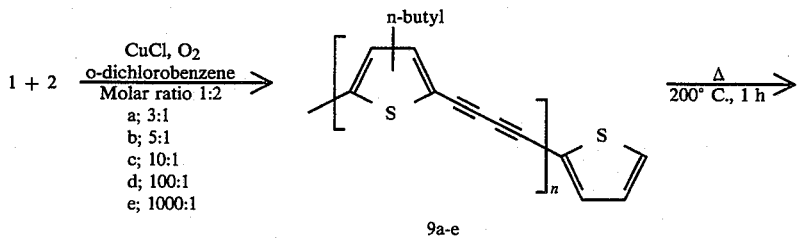
(3)
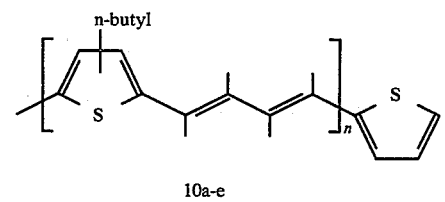
(4)
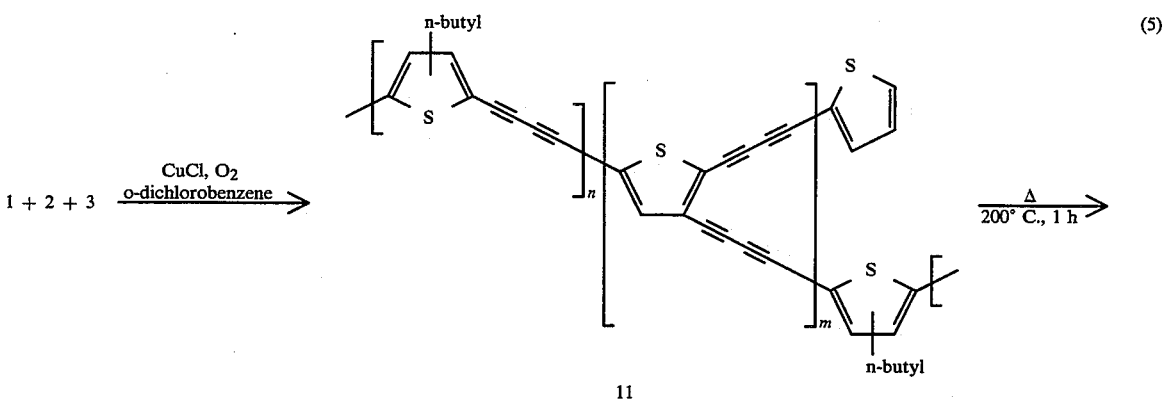
(5)

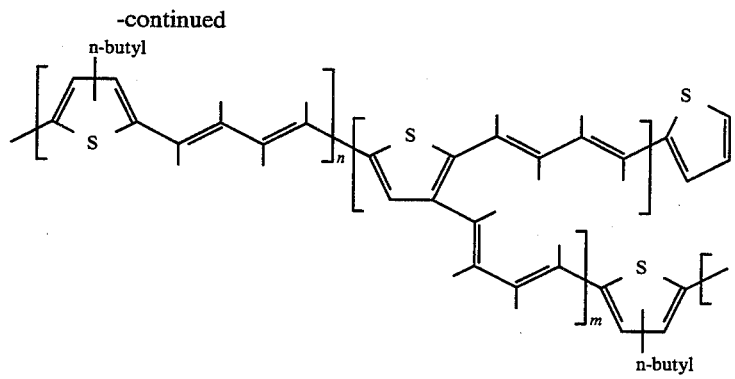

12

There is a need for oxidatively stable ceramics at elevated temperatures that have properties for making rigid components therefrom, such as engine parts, ceramic tiles, oxidatively stable coatings, and composite products for structural applications.

SUMMARY OF THE INVENTION

It is therefore an object of the present invention to provide oxidatively stable ceramics for high temperature applications made from cross-linked carborane-silane-alkenyl or carborane-siloxane-alkenyl thermosetting polymers or thermosets to form engine parts, ceramic tiles, oxidatively stable coatings, and composite products for structural applications. These and other objects are accomplished by pyrolyzing precursor linear and thermosetting organoboron cross-linked polymers.

BRIEF DESCRIPTION OF THE DRAWINGS

A more complete appreciation of the present invention and several of the accompanying advantages thereof will be readily obtained by reference to the following detailed description when considered in conjunction with the accompanying drawings, wherein.

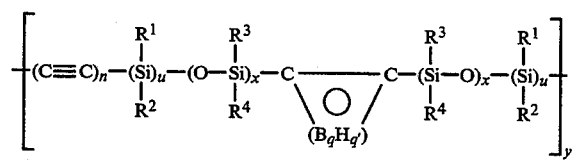

where $n=2$, $q=q'=10$, $u=x=1$, $R^1=R^2=R^3=R^4=CH_3$, and $y \approx 11$ (MW$\approx$4900). The thermoset polymer is formed between 150°–450 ° C. and the ceramic is formed at temperatures equal to or greater than 450 ° C.

Figure 2:
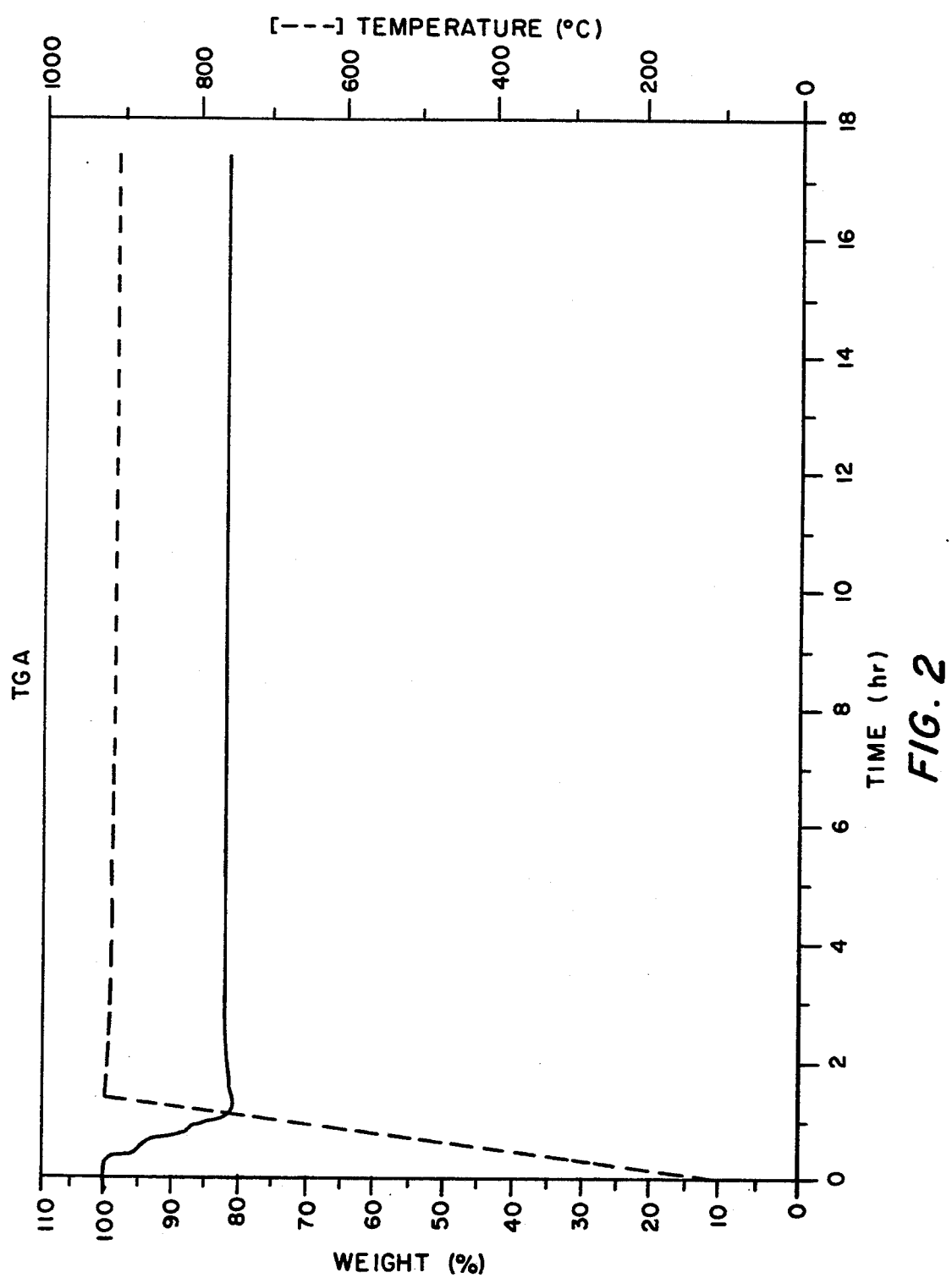

FIG. 2 is a thermogravimetric analytical (TGA) plot of weight % versus temperature in an atmosphere of nitrogen of the ceramic made from the thermoset which, in turn, is made from the polymer (2) poly (butadiyne-1,7-bis (tetramethyldisiloxanyl)-closo-dodeca-meta-carborane) where $n=2$, $q=q'=10$, $u=x=1$, $R^1=R^2=R^3=R^4=CH_3$, and $y \approx 11$ (MW$\approx$4900). The thermoset polymer is formed between 150°–450° C. and the ceramic is formed at temperatures equal to or greater than 450° C.

DETAILED DESCRIPTION OF THE PREFERRED EMBODIMENT

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

This invention relates to a new class of ceramics made from cross-linked thermosetting polymers (3) made by the following reaction:

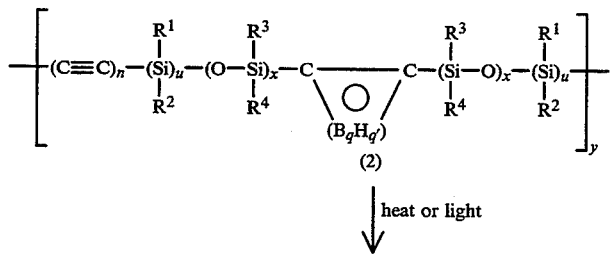

(2)

↓ heat or light

-continued

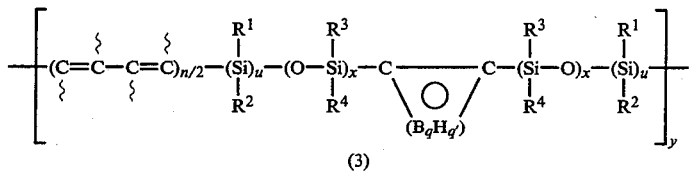
(3)

The conversion of the linear polymers (2) to the cross-linked polymers (3) is accomplished either by exposing the linear polymers (2) to heat or light. Thermal conversion of the carbon-to-carbon triple bonds in polymers (2) to form the thermosetting polymers (3) is dependent on both the curing temperature and the curing time. The heating of the linear polymers (2) is carried out over a curing temperature range sufficient for the cross-linking of the carbon-to-carbon triple bonds of the individual linear polymers (2) to occur resulting in the formation of a single mass of cross-linked polymers (3). The heating of the linear polymers (2) is carried out over a curing time sufficient for the cross linking of the carbon-to-carbon triple bonds of the individual linear polymers (2) to occur resulting in the formation of the cross-linked polymers (3). In general, the curing time is inversely related to the curing temperature. The typical temperature range, the preferred temperature range, the more preferred temperature range and the most preferred temperature range for the thermal conversion of linear polymers (2) to the cross-linked thermoset polymers (3) are, typically, 150°–450° C., 200°–400° C., 225°–375° C. and 250°–350° C., respectively. The typical curing time, the preferred curing time, the more preferred curing time, and the most preferred curing time for the thermal conversion of linear polymers (2) to the cross-linked thermoset polymers (3) are, typically, 1–48 hours, 2–24 hours, 8–12 hours and 1–8 hours, respectively.

The photocrosslinking process, of converting the carbon-to-carbon triple bonds of the linear polymers (2) into unsaturated cross-linked moieties necessary for forming the thermosetting polymers (3), is dependent on both the exposure time and the intensity of the light used during the photocrosslinking process. Ultraviolet (UV) light is the most preferred wavelength of light used during the photocrosslinking process. The exposure time of the linear polymers (2) to the UV light is inversely related to the intensity of the UV light used. The exposure time to the UV or to other light used is that time which is sufficient for the carbon-to-carbon triple bonds of the linear polymers (2) to be cross linked to form the thermosetting polymers (3). The intensity of the light used is that intensity which is sufficient for the carbon-to-carbon triple bonds of the linear polymers (2) to be cross linked to form the thermosetting polymers (3). Furthermore, the wavelength of the light used is not limited to the UV range. The wavelength of light used is that wavelength which is sufficient for the carbon-to-carbon triple bonds of the linear polymers (2) to be cross linked to form the thermosetting polymers (3). The typical exposure time, the preferred exposure time, the more preferred exposure time and the most preferred exposure time are, typically, 1–100 hours, 24–36 hours, 12–24 hours and 4–8 hours, respectively. Examples of the conversion of linear polymers (2) to the cross-linked thermosets (3) are given below.

The Patent Application of Keller etal. titled Carborane-(Siloxane or Silane)-Unsaturated Hydrocarbon Based Polymers, designated under Navy Case No.: 74,945 with Ser. No. 07/983,194 and filed on Nov. 30, 1992, is incorporated herein by reference. The Patent Application, filed on Nov. 30, 1992, teaches one how to make the precursor linear polymers (2) needed for making the thermosets or thermosetting polymers (3), from which the ceramics, the subject of the present invention, are made.

The ceramics are made by pyrolyzing the thermosetting polymers (3), typically, between 450°–2750° C., in an inert atmosphere, such as N$_2$ or by pyrolyzing the thermosetting polymers (3), typically, between 450°–1650° C., in an oxidizing atmosphere, such as air, as follows:

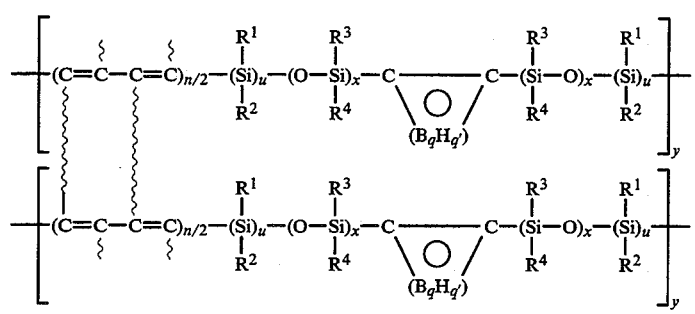

The linear polymers (2) may be poured into a mold and heated between 150°-450° C. to form the thermosetting polymers (3) either in conjunction with another filler material or reinforcing fibrous material, to add structural strength, or without such additive materials to form a solid or composite product. In an inert atmosphere, the thermosetting polymers (3) are then pyrolyzed (heated), typically, between 450°-2750° C. to form the ceramics (4), which maintain the shape of original mold. One advantage of making these ceramics (4) is that they can be readily formed into various shapes due to the liquid state of the precursor linear polymers (2) and the ease of converting these linear polymers into the thermosetting polymers (3) by heating, typically, between 150°-450° C. and then into the ceramics (4) by continuing to heat, typically, between 450°-2750° C., in an inert atmosphere including $N_2$, At, or He or, typically, between 450°-1650° C., in an oxidizing atmosphere such as air. The heating ranges given are, typically, at 1 atm. pressure; however, the heating temperatures may be varied with the pressure. Thus, when the pressure is less than i atm., for example, under a vacuum, the heating range is reduced sufficiently to drive off volatiles and to convert the thermosetting polymers (3) to the ceramics (4).

In an inert atmosphere, the typical pyrolyzing temperature range, the preferred pyrolyzing temperature range, the more preferred pyrolyzing temperature range and the most preferred pyrolyzing temperature range for converting the thermosetting polymers (3) into the ceramics (4) at 1 atm. pressure are 450°-2750° C., 450°-2000° C., 450°-1500° C. and 450°-1300° C., respectively. In an oxidizing atmosphere, the typical pyrolyzing temperature range, the preferred pyrolyzing temperature range, the more preferred pyrolyzing temperature range and the most preferred pyrolyzing temperature range for converting the thermosetting polymers (3) into the ceramics (4) at 1 atm. pressure are 450°-1650° C., 450°-1500° C., 450°-1350° C. and 450°-1100° C., respectively. Generally, the heating rate is that heating rate which is sufficient to drive off any volatile compounds from the thermosetting polymers (3) and to form the desired ceramics (4). The heating rate is not a limiting factor of the present invention. However, the typical heating rate, the preferred heating rate, the more preferred heating rate and the most preferred heating rate are 0.01°-200° C./min., 0.01°-100° C./min., 0.01°-50° C./min. and 0.01°-25° C./min., respectively. Similarly, the cooling rate is that sufficient to cool the formed ceramics (4) without causing significant thermal stresses or significant reduction in structural integrity of the formed ceramics (4). The cooling rate of the formed ceramics (4) is not a limiting factor of the present invention. However, the typical cooling rate, the preferred cooling rate, the more preferred cooling rate and the most preferred cooling rate are 0.01°-200° C./min., 0.01°-100° C./min., 0.01°-50° C./min. and 0.01°-25° C./min., respectively.

It should be noted that ceramics are better suited than plastics or metals for use in applications requiring high temperature resistance, electrical resistivity, corrosion resistance, abrasion resistance, dielectric strength and low weight. Applications include integrated circuits, electrical and electronic components, tools, dies, mechanical seals, catalyst substrates, engine parts, protective coatings and structural components.

The general chemical scheme for synthesizing the linear polymers (2) is represented by the exemplary synthesis of (2') given below:

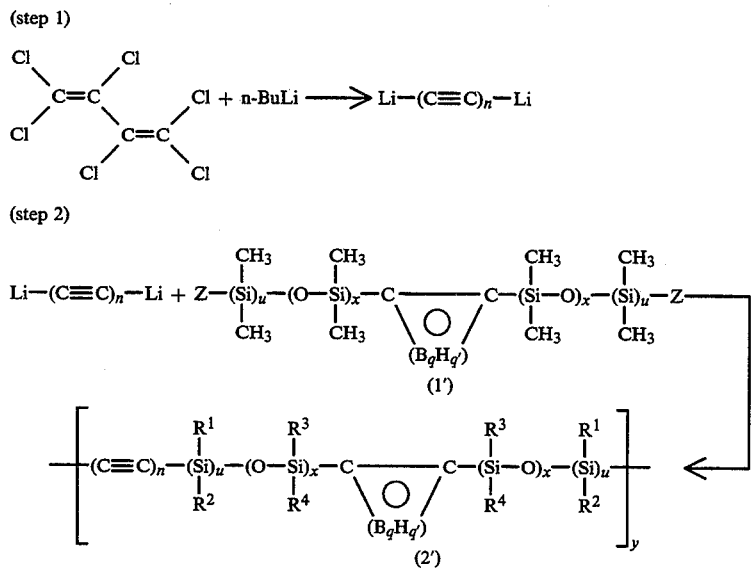

where:
(1) n=2, u=x=1, and y is a positive integer;
(2) —(C≡C)$_n$— represents a conjugated acetylenic moiety where n=2;
(3) $R^1=R^2=R^3=R^4=CH_3$;
(4)

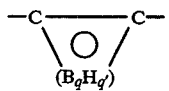

represents said carboranyl group; and
(5) q=g'=10;
(6) Z is selected from the group consisting of F, Cl, Br and I;
(7) Li—(C≡C)$_n$—Li represents a dilithio salt where n=2; and
(8) n-BuLi represents n-butyllithium.

Given the general scheme, step 1 involves forming a salt, for example, the dilithio salt of butadiyne by reacting 4 equivalents of n-BuLi with hexachlorobutadiene. To form the polymer (2') step 2 involves reacting equal molar concentrations of the dilithiobutadiyne produced in step 1 with compound (1').

It should be noted that if trichloroethylene is used in step 1 instead of hexachlorobutadiene, a salt of ethyne or acetylene is formed in step 1 where n=1. Consequently, an ethynyl moiety is incorporated into the polymer produced in step 2 where n=1. By using hexachlorobutadiene in step 1, the salt of butadiyne is formed where n=2. In turn, a butadiyne moiety is incorporated into polymer (2') where n=2. In order to form a polymer where n=3, a salt of hexatriyne needs to be formed in step 1. The synthesis of the disodium salt of hexatriyne is given in the article, by Bock and Seidl, titled *d-Orbital Effects in Silicon Substituted π-Electron Systems. Part XII. Some Spectroscopic Properties of Alkyl and Silyl Acetylenes and Polyacetylenes*, J. CHEM. SOC. (B), 1158 (1968) at pp. 1159. In a mixture of dry nitrogen, sodium (0.4mole) was dissolved in ammonia (150 ml), and to the solution 1,6-di-chlorohexa-2,4-diene (7.4 g., 0.05 mole) in ether (10 ml) was added at $-75°$. Under continued vigorous stirring, the solution was warmed to room temperature while ether (100 ml) was added. The reaction resulted in the formation of $NaC \equiv C-C \equiv C-C \equiv CNa$. The reaction can be represented as follows:

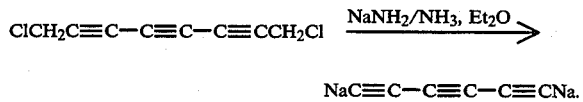

Thus, by forming the appropriate alkynyl salt, the length of the alkynyl moiety, represented by the value of n, incorporated into the polymer formed in step 2 can be controlled. Typically, the value of n can be varied from 1 to 12. Acetylenic derivatives having the general formula $H(C \equiv C)_nH$ can be readily converted into the dilithio salts by reacting with n-butyllithium. The respective dilithio salts, with values of n varying from 1 to 12, can then be incorporated into the backbone of polymers (2) as shown in the aforementioned step 2. The value of n can be varied, typically, from 1 to 12, more often from 1 to 10 and 1 to 8, most often from 1 to 6 and, in particular, from 1 to 3 and 1 to 2. Acetylenic derivatives having the general formula $H(C \equiv C)_nH$ can be readily formed by the synthesis given by Eastmond et al. in *Silylation as a Protective Method for Terminal Alkynes in Oxidative Couplings—A General Synthesis of the Parent Polyynes*, 28 TETRAHEDRON 4601 (1972). Laboratory synthesis of the lower polyyne series $H(C \equiv C)_nH$ (n=2,3,4 and 5) is based upon low temperature sodamide dehydrohalogenation of α,ω-bis (chloromethyl)alkynes, $ClCH_2(C \equiv C)_{n-1}CH_2Cl$ in liquid ammonia, a technique which provided a convenient route to diacetylene but which proved increasingly troublesome for tri- and for tetra-acetylene. Pentaacetylene, the highest member of the series was obtained in ca 1% yield from the precursor, $ClCH_2(C \equiv C)_4CH_2Cl$. Polyynes in the series $H(C \equiv C)_nH$ (n=4,5,6,7,8,9,10 and 12) have been prepared in solution by sequences involving Cu-catalyses oxidative couplings (Hay technique) of silyl-protected terminal alkynes, partial cleavage (desilylation) of the products by alkali, recoupling and complete desilylation. Thus using conditions established in a model coupling $Et_3SiC \equiv CH$ (I)→$Et_3Si(C \equiv C)$-$_2SiEt_3$ (II), coupling of the silyldiyne $Et_3Si(C \equiv C)_2H$ (III) gives $Et_3Si(C \equiv C)_4SiEt_3$ (IV) which upon controlled cleavage yields a chromatographically separable mixture of $Et_3Si(C \equiv C)_4SiEt_3$ (IV), $Et_3Si(C \equiv -C)4H$ (V) and $H(C \equiv C)_4H$ (VI). Coupling of $Et_3Si(C \equiv C)_4H$ (V) in turn gives $Et_3Si(C \equiv C)_8SiEt_3$ (VII) which upon cleavage yields $Et_3Si(C \equiv C)_8H$ (VIII) and $H(C \equiv C)_8H$ (IX) and coupling of $Et_3Si(C \equiv C)_8H$ (VIII) gives the bissilylhexadecaacetylene $Et_3Si(C \equiv C)_{16}SiEt_3$ (X).

Hexa-acetylene may be synthesized analogously:

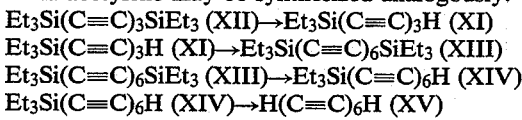

Dodeca-acetylene may be synthesized analogously:

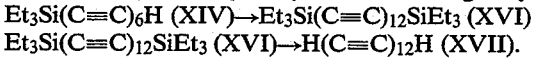

Other exemplary members of the series are prepared via mixed couplings:

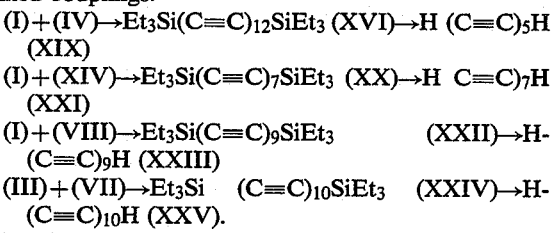

Furthermore, a variety of compounds can be produced that have structures similar to that of compound (1') shown in step 1. One variation includes replacing the methyl groups attached to the Si with other hydrocarbon or aromatic moieties. Typical reactions synthesizing disubstituted dichloro silanes of varying size (varying values of u) and having different R groups are known in the art:

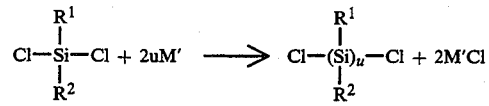

where M' is a group 1 metal or alloy. High molecular weight, linear, substituted silane polymers are usually prepared by Wurtz type coupling of the corresponding dichlorosilanes initiated by sodium dispersed in an aromatic or hydrocarbon solvent. A modified Wurtz-Fittig-type coupling reaction for the production of linear polysilylenes is shown in the reaction above. The above reaction is cited by ZELDIN ET AL. (EDITORS) in INORGANIC AND ORGANOMETALLIC POLYMERS, published by American Chemical Society, Washington, DC (1988) at 44 and 90. The value of u can be varied, typically, from 1 to 1000, more often from 1 to 500 and 1 to 250, most often from 1 to 100 and 1 to 10, and, in particular, from 1 to 6. Another variation of compound (1') includes controlling the values of x in addition to that of u.

Synthesis of a variation of compound (1') where u=1 and x=0 and Z=Cl is given by Papetti et al. in *A New Series of Organoboranes. VI. The Synthesis and Reactions of Some Silyl Neocarboranes*, 3 INORG. CHEM. 1448 (1964) at 1449, under the caption "C,C'-Bis (methyldichlorosilyl)neocarborane (IV)." The synthesis of compound (1') where u=1 and x=1 and Z=Cl is given by Papetti et al. in *A New Series of Organoboranes. VII. The Preparation of Poly-m-carboranylenesiloxanes*, 4 JOUR- NAL OF POLYMER SCIENCE: PART A-1, 1623 (1966) at 1630, incorporated herein by reference, under the caption "Compound (VII)." Synthesis of a variation of compound (1') where u=1 and x=2 and Z=Cl is given by Scott et al. in *Icosahedral Carboranes. XV. Monomeric Carboranylenesiloxanes,* 9 INORG. CHEM. 2597 (1970) at 2599, incorporated herein by reference, under the caption "1,7-Bis (5-chlorohexamethyltrisiloxanyl)-m-carborane (IV)."

While leaving u=1, the value of x can be varied, typically, from 0 to 1000, more often from 0 to 500 and 0 to 250, most often from 0 to 10, and, in particular, from 0 to 2 by the following proposed reaction scheme:

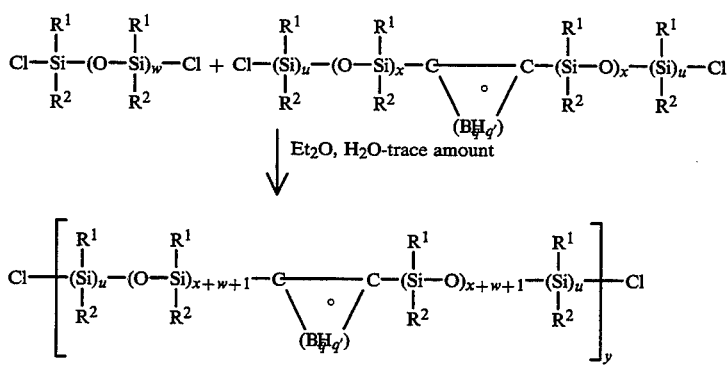

where x and w are integers greater than or equal to 0 ($x \geq 0$; $w \geq 0$), y is an integer greater than or equal to 1 ($y \geq 1$) and u is a positive integer.

Following the scheme in the aforementioned steps 1 and 2, the linear polymers (2) can be formed by reacting a salt of an alkyne or a respective Grignard reagent with compound (1):

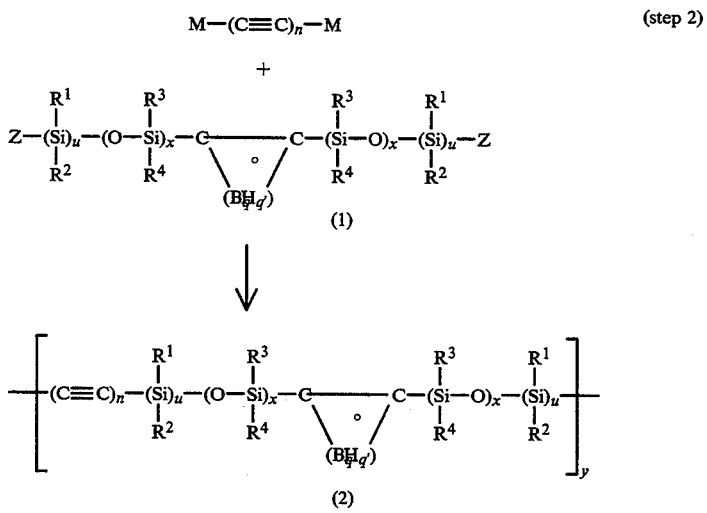

where:
(1) n is an integer from 1 to 12 and u and y are positive integers;

(2) —(C≡C)$_n$— represents an unconjugated acetylenic moiety or a conjugated acetylenic moiety when n is an integer greater than 1;

(3) $R^1$, $R^2$, $R^3$ and $R^4$ represent hydrocarbon or aromatic moieties;

(4)

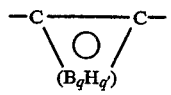

represents said carboranyl group; and (5) q and q' are integers from 3 to 16;

(6) Z is selected from the group consisting of F, Cl, Br and I;

(7) M—(C≡C)$_n$—M represents a salt of an alkyne or the respective Grignard reagent where M is selected from the group consisting of Li, Na, K and MgX' where X' is selected from the group consisting of F, Cl, Br and I; and (8) x represents an integer greater than or equal to zero ($x \geq 0$).

These linear polymers (2) exhibit sufficiently low viscosities either at room temperature or at their respective melting points (mp≈200° C.) to readily fill complex dies or shapes for forming parts therefrom. In addition, (step 2)

these linear polymers (2) can be further polymerized into thermosets (3) and ceramics that form rigid shapes which are oxidatively stable at high temperatures above 600° C. Two of the examples given detail the synthesis of polymer (2') and related polymer (2″), polymer (2″) having the structure:

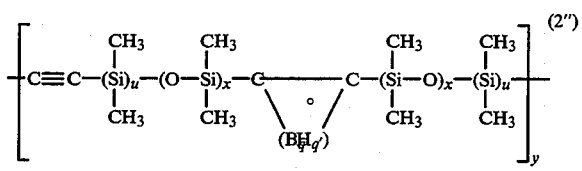

where:

(1) u=1 and x=0, q=q'=10 and y is a positive integer.

EXAMPLES OF THE SYNTHESIS OF LINEAR POLYMERS (2)

Example 1

Synthesis of Poly(Butadiyne-1,7-bis(tetramethyldisiloxanyl)-closo-dodeca-meta-carborane) (2')

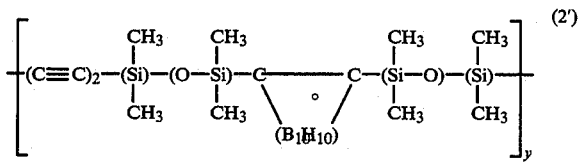

Dilithiobutadiyne was prepared by the method of Ijadi-Magshoodi and Barton. See S. Ijadi-Magshoodi, Y. Pang, and T. J. Barton, *Efficient, "One-Pot" Synthesis of Silylene-Acetylene and Disilylene-Acetylene Preceramic Polymers from Trichloroethyene*, 28 J. POLYM. SCI., PART A: POLYM. CHEM. 955 (1990). According to Magshoodi et al., 4 equivalents of n-BuLi in THF are cooled to −78° C. and hexachlorobutadiene is slowly added. After warming to room temperature, the dilithiobutadiyne is not isolated before use. In a typical synthesis, N-BuLi (34.2ml, 85.5 mmol) in 12.0 ml THF was cooled to −78° C. Hexachlorobutadiene (5.58 g, 21.4 mmol) in 2.0 ml THF was added dropwise by cannula. The reaction was allowed to warm to room temperature and stirred for 2 hrs. Then dilithiobutadiyne/THF was again cooled to −78° C. To this, an equal-molar amount of the 1,7-bis (chlorotetramethyldisiloxanyl)-closo-dodeca-meta-carborane (1') (10.22 g, 21.4mmol) in 4.0 ml THF was added dropwise by cannula. The temperature of the reaction mixture was allowed to slowly rise to ambient temperature and stirred overnight. A white solid (LiCl) was filtered off and the solvent removed by evaporation at reduced pressure leaving (2').

The polymer (2') was dissolved in ether and dried over sodium sulfate. After filtration through Celite, the ether was evaporated at reduced pressure, leaving the dark-brown viscous polymer (2'). A 97% yield (9.5 g) was obtained after drying in vacuo. Gel-permeation chromatography (GPC) indicated the presence of low molecular weight species (MW~500) as well as higher average molecular weight polymers (MW~4900). Drying under vacuum at 150° C. removed lower-weight volatiles giving a 90% overall yield. Major IR peaks (cm$^{-1}$): 2963 (C-H stretch); 2600 (B-H stretch); 2175 (C≡C stretch); 1260 (Si-CH$_3$ deformation).

Example 2

Synthesis of Poly(ethyn-1,7-bis(dimethylsilyl)-closo-dodeca-meta-carborane (2")

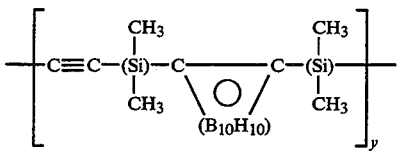

Dilithioacetylene has the formula:

Li—C≡C—Li and it is prepared by the method of Ijadi-Magshoodi et al. See S. Ijadi-Magshoodi, Y. Pang, and T. J. Barton 28 J. POLYM. SCI., PART A: POLYM. THEM. 955 (1990). According to the Ijadi-Magshoodi method for preparing dilithioacetylene, 3 equivalents of n-BuLi in THF are cooled to −78° C. and trichloroethylene is slowly added. After warming to room temperature, the dilithioacetylene is not isolated before use. In a typical synthesis, n-BuLi (21.6 ml, 54.0 mmol) in 10.0 ml THF was cooled to −78° C. under an argon atmosphere. Trichloroethylene (1.6 ml, 18.0 mmol) in 5.0 ml THF was added dropwise. The reaction was permitted to warm to room temperature and stirred for 14 hrs.

Compound (1") is synthesized according to the method of Papetti & Heying. See S. Papetti et al. 3 INORG CHEM 1448 (1964). The structure of compound (1") is given below:

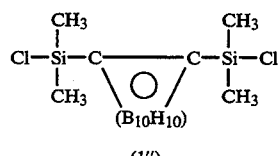

According to the method of Papetti et al., a 100 ml round bottom 3-neck flask was fitted with an addition funnel and septa, flushed with argon, and flamed. The reaction was carried out under an inert atmosphere (argon). Butyllithium (18.0 ml/2.5M in hexanes, 44.9 mmol) was cooled to −78° C. Meta-carborane (2.5902 g, 18.0 mmol) in 10 ml THF was added dropwise. A white solid (dilithiocarborane) formed and the reaction was allowed to warm to ambient temperature. After cooling the reaction mixture back to −78° C., dichlorodimethylsilane (5.5 ml, 43.5 mmol) was added dropwise. The product (1') in solution was not isolated.

To form the product (2"), the dilithioacetylene is reacted with (1"). The dilithioacetylene in THF was cooled back to −78° C. To this, (1"), as previously-prepared, was added dropwise (18.0 mmol, 5.93 g) and allowed to warm to ambient temperature and stirred overnight. The solvent was removed by evaporation at reduced pressure leaving behind the dark brown polymer (2").

EXAMPLES OF CONVERSIONS TO CROSS-LINKED THERMOSETS (3)

Example 3

Conversion of Poly[1,7-dicarbadodecborane(12)-1,7-diyl-(1,1,3,3-tetramethyl-1,3-disiloxanediyl)-butadiynediyl](3) to Thermosetting Polymer (3)

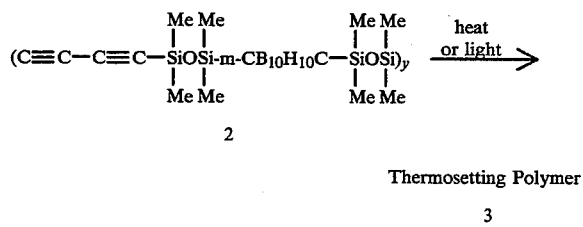

Thermosetting Polymer

3

Thermal Polymerization of 2

A 1.03 g sample 2 of a viscous liquid, was heated on a hotplate. Temperature of the hotplate was measured with a PTC ® surface thermometer (±5° C.). When 2 was heated above 100° C. for 2 hr, it became thinner and runny. The linear polymer 2 was cured by heating at 150° C. for 30 min, at 198° C. for 45 min, at 250° C. for 30 min, at 320° C. for 1 hr, and at 340° C. for 1 hr. While heating at 198° C. for 45 min, 2 increased in viscosity and became very sticky as determined by touching a glass rod to the surface. Upon further heating to 250° C., 2 began to solidify, had hardened somewhat while at 320° C., and became a hard solid dark glass 3 at 340° C., During the heat treatment, 13 wt % of volatiles were evolved from the sample.

EXAMPLE 4

Photocrosslinking of 2 to Produce 3

The polymer 2 was dissolved in methylene chloride. The solution was then placed on a platinum screen 1 inch square and the solvent was evaporated leaving behind a film of polymer 2 on the platinum screen. This process was repeated until a reasonable IR spectrum of 2 could be obtained using a Fourier Transform Infrared Spectrometer (FTIR). A mercury lamp with a Jarrell-Ash power supply was used without monochrometer or filters to irradiate 2 either in air or in argon. The screen was mounted on an IR cell holder so that 2 could be irradiated in the holder and both could be moved without disturbing their relative positions for monitoring by IR. Irradiation of the polymer either in air or in inert atmospheres resulted in a decrease of the intensity of the triple bond absorption (2170 cm$^{-1}$) as determined from FTIR spectroscopy. The irradiation was continued until the absorption due to the triple bond had disappeared.

EXAMPLE 5

A sample of 2 (1.5490 g) was converted to 3 by quickly heating to 300° C. in argon, cured consecutively at 320°, 350°, and 400° C. for 2 hours at each temperature, and then cooled at 1° C./min. The resulting void-free dark brown solid, 3, weighed 1.4840 g (96 wt % of 2). IR (cm$^{-1}$): 2963 (C-H stretch); 2599 (B-H stretch); 1410; 1262 (Si-CH$_3$ deformation).

Example 6

FIG. 2 shows a TGA of a sample of 3 obtained by curing 2 under nitrogen consecutively for 2 hr at 250°, 300°, 325°, and 350° C. The TGA thermogram was determined on the cured sample 3 from 100° to 900° C. A single thermal degradative process is apparent starting at ≈420° C. with an 82 wt % residue retention at 900° C.

Example 7

Three samples of 2 (0.5331, 0.6284, and 0.5819 g) were thermally cross-linked to form homogeneous hard dark brown (almost black) solids 3 by heating at 300° C. for 4 hr in argon. Weight losses were 2.8, 2.6, and 3.2 wt %, respectively. The second sample was then heated in argon for 4 hr at 400° C. resulting in a loss of an additional 5.2 wt %. Visually, there was no change in the sample after the 400° C. cure.

Example 8

The third sample of EXAMPLE 7 was heated to 400° C. for 4 hr in air resulting in a weight loss of 6.4 wt %. The appearance of this sample differed from previous samples heated under inert atmospheres. The sample seemed to segregate into different components, like cement around irregularly shaped flat stone tiles, the cement having an orangish brown outline at the interfaces. Closer examination, however, reveals that what looks like stone tiles is only on the sample surface and the arteries that seemingly surround the plates are actually part of the glass-like bulk underneath the plates. Surface analysis studies indicate that the surface is enriched with oxide forms of boron and silicon.

Example 9

A solid disk of 3 (1.2263 g) was obtained by curing at a maximum temperature of 400° C. for 4 hr. The resulting sample was heated for 100 hr in a flow of air resulting in a loss of 6.8 wt %. The surface of the disk after heating was covered with yellow-brown and black flakes, some of which had fallen off. Removal of the flakes left imprints on the surface similar in shape to the flat irregular-shaped flat stone tiles described in EXAMPLE 8. However, the structural integrity of the bulk of the disk remained as a black void-free glass.

Example 10

Figure 1:
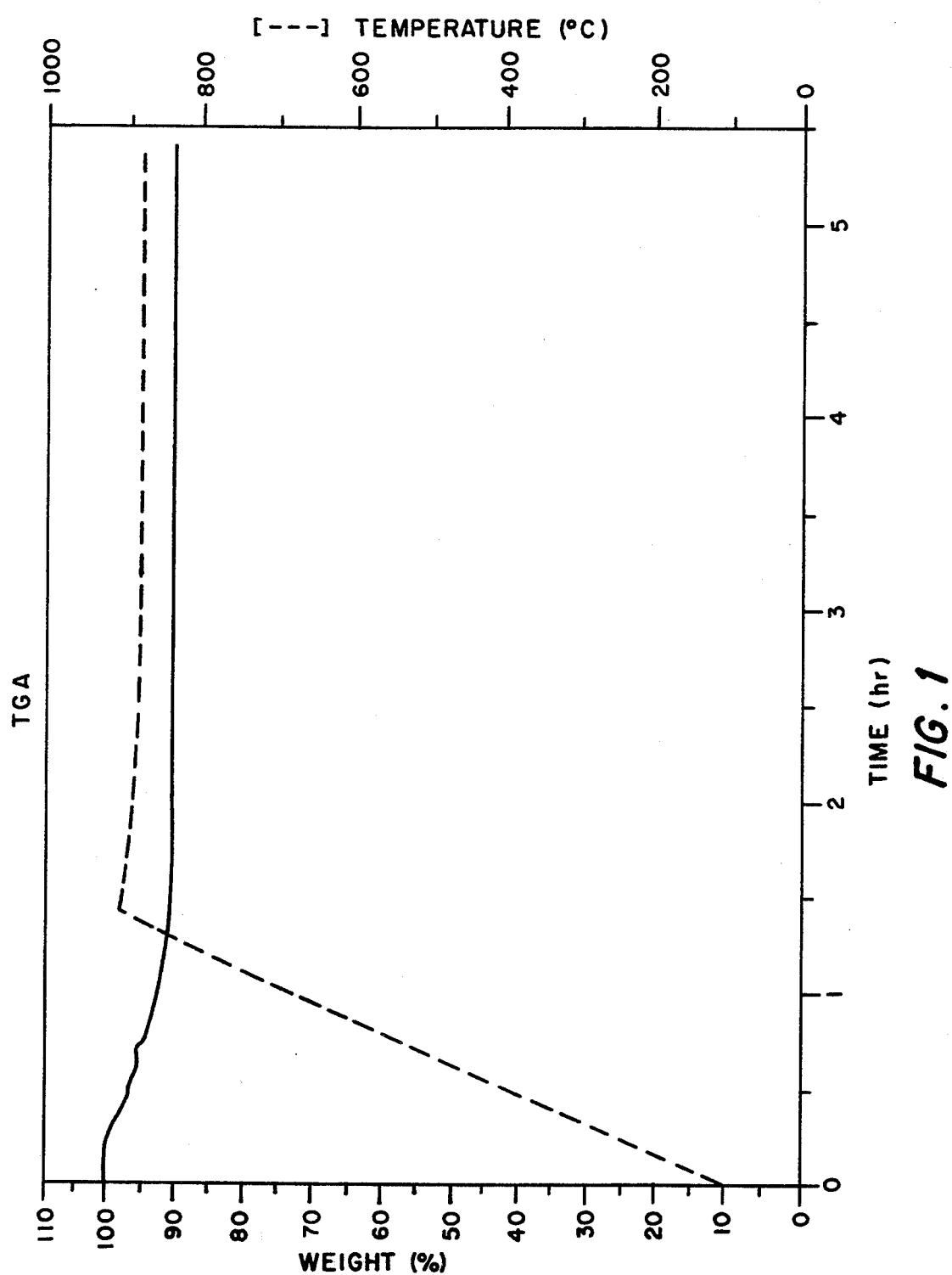
FIG. 1 is a thermogravimetric analytical (TGA) plot of weight % versus temperature in an oxidizing environment (air) of the ceramic made from the thermoset which, in turn, is made from the polymer (2) poly(-butadiyne-1,7-bis(tetramethyldisiloxanyl)-closo-dodeca-meta-carborane) having the formula.

FIG. 1 shows a TGA in air of 3 obtained by curing 2 in air for 2 hr at 300 and at 450° C. for 3 hr. The TGA was determined on a powdery sample of 3 from 200 to 860° C. The residue at 860° C. has actually gained 1 wt %. Two thermo-oxidative degradation processes are observed each followed by periods of weight gain. We believe the gains in weight are due to the formation of oxidative protective layer, probably oxidation of boron and silicon. Weight loss first occurs from around 330° C. until 450° C. where the global minimum (96 wt %) is reached. The sample then gains weight until 550° C. (98.5 wt %) followed by a small loss up to 640° C. Weight again increases from there until 830° C. stabilizing at 101 wt %.

Example 11

Conversion of Poly[1,7-dicarbadodecborane(12)-1,7-diyl-(1,1,3,3-tetramethyl-1,3-disiloxanediyl)-ethynediyl](2) to Thermosetting Polymer (3)

A sample (1.0 gm) of 2 was weighed in a aluminum planchet and cured in air by heating on a hot plate at 200° C. for 1 hr and at 300° C. for 2 hr. The dark brown thermosetting polymer 3 was somewhat brittle but exhibited superb thermal and oxidative properties at elevated temperatures.

EXAMPLES OF CONVERSIONS TO CERAMICS (4) FROM LINEAR POLYMERS (2) OR THERMOSETTING POLYMERS (3)

Example 12

A sample (1.55 gin) of poly[1,7-dicarbadodecborane(12)-1,7-diyl-(1,1,3,3-tetramethyl-1,3-disiloxanediyl)-butadiynediyl] was quickly heated to 300° C. The polymer was crosslinked by heating at 300°, 350°, and 400° C., consecutively, for 2 hours at each temperature. Upon cooling, a dark brown thermoset, which was 96% (1.48 gm) of the original weight, was obtained. Conversion of the thermoset was accomplished by heating to 900° C. The thermoset polymer was ramped to the pyrolysis temperature and cooled back to room temperature at 0.5° C./min producing a dark black ceramic material (85% ceramic yield).

Example 13

A sample (24 mg) of poly[1,7-dicarbadodecborane(12)-1,7-diyl-(1,1,3,3-tetramethyl-1,3-disiloxanediyl)-butadiynediyl] was weighed in a platinum TGA boat and heated at 10° C./min under a nitrogen atmosphere at a flow rate of 50 cc/min to 900° C. resulting in a ceramic yield of 87%. Upon cooling back to room temperature, the ceramic material was heated at 10° C./min to 900° C. under a flow rate of air at 50 cc/min. During the oxidative heat treatment, the ceramic material gained weight (1–2 weight percent) attributed to oxidation on the surface.

Example 14

A sample (17.7 mg) of poly[1,7-dicarbadodecborane(12)-1,7-diyl-(1,1,3,3-tetramethyl-1,3-disiloxanediyl)-butadiynediyl] was weighed in a platinum TGA boat and heated at 10° C./min under a nitrogen atmosphere at a flow rate of 50 cc/min to 900° C. and held at 900° C. for 1 hour resulting in a ceramic yield of 82%. The ceramic material was then heated isothermally at 500° C. for hours in air at a flow rate of 50 cc/min resulting in no further weight loss but actually a gain in weight of 1–2%.

Example 15

A sample (13 mg) of poly[1,7-dicarbadodecborane(12)-1,7-diyl-(1,1,3,3-tetramethyl-1,3-disiloxanediyl)-butadiynediyl] was weighed in a platinum TGA boat and heated at 10° C./min under a flow of air at 50 cc/min to 900° C. and held at 900° C. for 1 hour resulting in a ceramic yield of 87%. The resulting ceramic material was then heated isothermally at 500° C. for 12 hours in air at a flow rate of 50 cc/min yielding no apparent weight changes.

Example 16

A ceramic sample (0.11 gm), prepared from poly[1,7-dicarbadodecborane(12)-1,7-diyl-(1,1,3,3-tetramethyl-1,3-disiloxanediyl)-butadiynediyl]by heating at 300°, 350°, and 400° C., consecutively, for 4 hours at each temperature under a nitrogen atmosphere to afford the preceramic thermoset that was then converted into a ceramic material by further heating in sequence at 500°, 650°, 800°, and 900° C. for 4 hours each under an argon atmosphere, was used for aging studies in air. The sample was heated isothermally at 500° C. for 50 hours in an air circulating oven resulting in a weight loss of approximately 2.5%. The sample still retained its structural integrity after the aging at 500° C.

Example 17

A sample (14.1 mg) of poly[1,7-dicarbadodecborane(12)-1,7-diyl-(1,1,3,3-tetramethyl-1,3-disiloxanediyl)-butadiynediyl] was weighed in a platinum TGA boat and quickly heated to 300° C. The polymer was crosslinked by heating under a nitrogen atmosphere at 300°, 350°, 375°, and 400° C., consecutively, for 2 hours at each temperature. Upon cooling to room temperature, the preceramic thermoset was converted to a ceramic material by heating to 900° C. at 10° C./min in air at a flow rate of 50 cc/min. At 900° C., the material exhibited a ceramic yield of 83%. Upon cooling and rerunning the TGA thermogram in air, no further weight changes were observed with the ceramic sample.

Example 16

A sample (14.1 mg) of poly[1,7-dicarbadodecborane(12)-1,7-diyl-(1,1,3,3-tetramethyl-1,3-disiloxanediyl)-butadiynediyl] was weighed in a platinum TGA boat and heated at 10° C./min under a flow of air at 50 cc/min to 900° C. resulting in a ceramic yield of 87%. Upon cooling and rerunning the TGA thermogram under a nitrogen atmosphere, no further weight changes were observed in the ceramic sample.

Example 19

A sample (15.3 mg) of poly[1,7-dicarbadodecborane(12)-1,7-diyl-(1,1,3,3-tetramethyl-1,3-disiloxanediyl)-butadiynediyl] was weighed in a platinum TGA boat and quickly heated to 320° C. The polymer was crosslinked by heating under an air atmosphere at 320°, 350°, and 380° C., consecutively, for 2 hours at each temperature. Upon cooling to room temperature, the preceramic thermoset was converted to a ceramic material by heating to 900° C. at 10° C./min in air at a flow rate of 50 cc/min. At 900° C., the material exhibited a ceramic yield of 93%. Upon cooling and running a second thermogravimetric analysis under nitrogen and then under air no further weight changes were observed with the ceramic sample.

Example 20

The ceramic sample, which had been aged for 50 hours at 500° C. in air as in Example 5, was further aged at 500° C. in air for an additional 50 hours. Total time at 500° C. was 100 hours. The sample did not loss any additional weight. Sample still retained it structural integrity.

Example 21

A sample (13.7 mg) of poly[1,7-dicarbadodecborane(12)-1,7-diyl-(1,1,3,3-tetramethyl-1,3-disiloxanediyl)-butadiynediyl] was weighed in a platinum TGA boat and heated at 10° C./min under a flow of air at 50 cc/min to 900° C. resulting in a ceramic yield of 92%. The ceramic was aged at 900° C. for 4 hours resulting in a slight weight gain attributed to the formation of a protective layer enriched in silicon oxide. Moreover, the sample retained its structural integrity. This observed behavior enhances the importance of the ceramic for high temperature structural applications.

Example 22

A sample (22.3 mg) of poly[1,7-dicarbadodecaborane(12)-1,7-diyl-(1,1,3,3-tetramethyl-1,3-disiloxanediyl)-butadiynediyl] was weighed in a platinum TGA boat and heated at 10° C./min under a flow of nitrogen at 50 cc/min to 900° C. resulting in a ceramic yield of 83%. The ceramic material was then aged at 900° C. in a flow of air for 4 hours resulting in a slight weight gain attributed to the formation of a protective layer enriched in silicon oxide.

Example 23

A sample (12.7 mg) of poly[1,7-dicarbadodecaborane(12)-1,7-diyl-(1,1,3,3-tetramethyl-1,3-disiloxanediyl)-butadiynediyl] was weighed in a platinum TGA boat and heated at 10° C./min under a flow of nitrogen at 50 cc/min to 900° C. resulting in a ceramic yield of 83%. The ceramic material was then aged at 900° C. in a flow of nitrogen for 16 hours resulting in a very slight weight gain probably attributed to a trace amount of oxygen being in the nitrogen. During the aging at 900° C., the sample retained its structural integrity. This observation enhances the importance of the ceramic material for high temperature structural applications.

What is claimed is:

1. A boron-carbon-silicon ceramic made by a method comprising the step of:

pyrolyzing an organoboron thermoset polymer having a repeating unit of the formula:

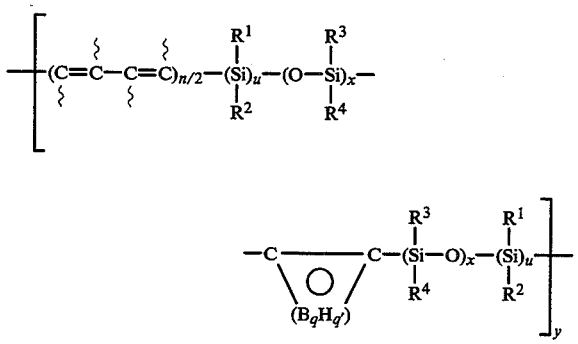

wherein:
(1) n is an integer from 1 to 12 and u and y are positive integers;
(2)

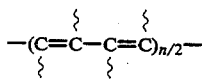

represents said unsaturated cross-linked moiety;
(3) $R^1$, $R^2$, $R^3$ and $R^4$ represent hydrocarbon or aromatic moieties:
(4)

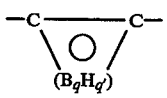

represents said carboranyl group;
(5) q and q' are integers from 3 to 16;

(6) x represents an integer greater than or equal to zero ($x \geq 0$); and wherein said thermoset has a ceramic yield of at least 82% by weight.

2. The ceramic of claim 1 wherein said carboranyl group of said organoboron thermoset polymer represents a carboranyl group selected from the group consisting of 1,7-dodecacarboranyl; 1,10-octacarboranyl; 1,6-octacarboranyl; 2,4-pentacarboranyl; 1,6-tetracarboranyl; 9-alkyl-1,7-dodecacarboranyl; 9,10-dialkyl-1,7-dodecacarboranyl; 2-alkyl-1,10-octacarboranyl; 8-alkyl-1,6-octacarboranyl; decachloro-1,7-dodecacarboranyl; octachloro-1,10-octacarboranyl; decafluoro-1,7-dodecacarboranyl; octafluoro-1,10-octacarboranyl and mixtures thereof.

3. The ceramic of claim 1 wherein said carboranyl group of said organoboron thermoset polymer represents a closo-dodecacarboranyl group selected from the group consisting of closo-dodeca-ortho-carboranyl, closo-dodeca-meta-carboranyl, closo-dodeca-para-carboranyl and mixtures thereof.

4. The ceramic of claim 1 wherein said $R^1$, said $R^2$, said $R^3$ and said $R^4$ of said organoboron thermoset polymer may be the same or different and wherein each said $R^1$, said $R^2$, said $R^3$ and said $R^4$ represents a hydrocarbon group having up to 20 carbon atoms and being selected from the group consisting of alkyl, aryl, alkylaryl and mixtures thereof.

5. The ceramic of claim 1 wherein said u, and said y of said organoboron thermoset polymer are integers from 1 to 1000 and said x is an integer from 0 to 1000 and said n is an integer from 1 to 12.

6. The ceramic of claim 1 wherein said u, and said y of la said organoboron thermoset polymer are integers from 1 to 500 and said x is an integer from 0 to 500 and said n is an integer from 1 to 10.

7. The ceramic of claim 1 wherein said u, and said y of said organoboron thermoset polymer are integers from 1 to 250 and said x is an integer from 0 to 250 and said n is an integer from 1 to 8.

8. The ceramic of claim 1 wherein said u, and said y of said organoboron thermoset polymer are integers from 1 to 100 and said x is an integer from 0 to 100 and said n is an integer from 1 to 6.

9. The ceramic of claim 1 wherein said n is an integer from 1 to 3 and said u is an integer from 1 to 10 and said x is an integer from 0 to 10 of said organoboron thermoset polymer.

10. The ceramic of claim 1 wherein said n is an integer from 1 to 2 and said u is an integer from 1 to 10 and said x is an integer from 0 to 10 of said organoboron thermoset polymer.

11. The ceramic of claim 1 wherein said n equals 1 and said u is an integer from 1 to 6 and said x is an integer from 0 to 2 of said organoboron thermoset polymer.

12. The ceramic of claim 1 wherein said pyrolyzing step includes heating said organoboron thermoset polymer between 450° C. to 2750° C. in an inert atmosphere.

13. The ceramic of claim 1 wherein said pyrolyzing step includes heating said organoboron thermoset polymer between 450° C. to 2000° C. in an inert atmosphere.

14. The ceramic of claim 1 wherein said pyrolyzing step includes heating said organoboron thermoset polymer between 450° C. to 1500° C. in an inert atmosphere.

15. The ceramic of claim 1 wherein said pyrolyzing step includes heating said organoboron thermoset polymer between 450° C. to 1300° C. in an inert atmosphere.

16. The ceramic of claim 1 wherein said pyrolyzing step includes heating said organoboron thermoset polymer between 450° C. to 1650° C. in an oxidizing atmosphere.

17. The ceramic of claim 1 wherein said pyrolyzing step includes heating said organoboron thermoset polymer between 450° C. to 1300° C. in an oxidizing atmosphere.

18. The ceramic of claim 1 wherein said pyrolyzing step includes heating said organoboron thermoset polymer between 450° C. to 1100° C. in an oxidizing atmosphere.

19. The ceramic of claim 1 wherein said pyrolyzing step includes heating said organoboron thermoset polymer between 450° C. to 900° C. in an oxidizing atmosphere.

20. A method for making a boron-carbon-silicon ceramic comprising the step of:
pyrolyzing an organoboron thermoset polymer having a repeating unit: of the formula:

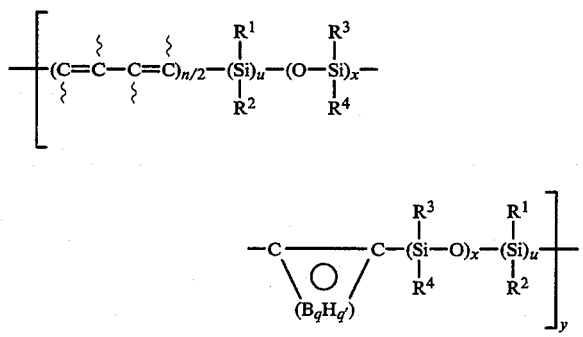

wherein:
(1) n is an integer from 1 to 12 and u and y are positive integers;
(2)

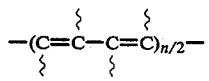

represents said unsaturated cross-linked moiety;
(3) $R^1, R^2, R^3$ and $R^4$ represent hydrocarbon or aromatic moieties;
(4)

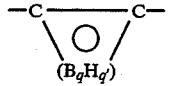

represents said carboranyl group;
(5) q and q' are integers from 3 to 16;
(6) x represents an integer greater than or equal to zero ($x \geq 0$); and wherein said thermoset has a ceramic yield of at least 82% by weight.

21. The method of claim 20 wherein said carboranyl group of said organoboron thermoset polymer represents a carboranyl group selected from the group consisting of 1,7-dodecacarboranyl; 1,10-octacarboranyl; 1,6-octacarboranyl; 2,4-pentacarboranyl; 1,6-tetracarboranyl; 9-alkyl-1,7-dodecacarboranyl; 9,10-dialkyl-1,7-dodecacarboranyl; 2-alkyl-1,10-octacarboranyl; 8-alkyl-1,6-octacarboranyl; decachloro-1,7-dodecacarboranyl; octachloro-1,10-octacarboranyl; decafluoro-1,7-dodecacarboranyl; octafluoro-1,10-octacarboranyl and mixtures thereof.

22. The method of claim 28 wherein said pyrolyzing step further comprises heating said organoboron thermoset polymer between 450° C. to 2750° C. in an inert atmosphere.

23. The method of claim 20 wherein said pyrolyzing step further comprises heating said organoboron thermoset polymer between 450° C. to 2000° C. in an inert atmosphere.

24. The method of claim 20 wherein said pyrolyzing step further comprises heating said organoboron thermoset polymer between 450° C. to 1500° C. in an inert atmosphere.

25. The method of claim 20 wherein said pyrolyzing step further comprises heating said organoboron thermoset polymer between 450° C. to 1300° C. in an inert atmosphere.

26. The method of claim 20 wherein said pyrolyzing step further comprises heating said organoboron thermoset polymer between 450° C. to 1650° C. in an oxidizing atmosphere.

27. The method of claim 20 wherein said pyrolyzing step further comprises heating said organoboron thermoset polymer between 450° C. to 1300° C. in an oxidizing atmosphere.

28. The method of claim 20 wherein said pyrolyzing step further comprises heating said organoboron thermoset polymer between 450° C. to 1100° C. in an oxidizing atmosphere.

29. The method of claim 20 wherein said pyrolyzing step further comprises heating said organoboron thermoset polymer between 450° C. to 900° C. in an oxidizing atmosphere.

30. The ceramic of claim 20 wherein said $R^1$, said $R^2$, said $R^3$ and said $R^4$ of said organoboron thermoset polymer may be the same or different and wherein each said $R^1$, said $R^2$, said $R^3$ and said $R^4$ represents a halogenareal-hydrocarbon group having up to 20 carbon atoms and being selected from the group consisting of haloalkyl, haloaryl and mixtures thereof.

* * * * *